(12) United States Patent
Kyprianou et al.

(10) Patent No.: US 9,116,616 B2
(45) Date of Patent: Aug. 25, 2015

(54) PORTABLE ELECTRONIC DEVICE AND METHOD OF CONTROLLING SAME

(75) Inventors: Nikos Kyprianou, Toronto (CA); Houssam Kanj, Waterloo (CA); Huanhuan Gu, Kitchener (CA); James Paul Warden, Fort Worth, TX (US); Aleksandar Ivanovic, Toronto (CA); Michael Polyakin, Waterloo (CA)

(73) Assignee: BLACKBERRY LIMITED, Waterloo (CA)

(*) Notice: Subject to any disclaimer, the term of this patent is extended or adjusted under 35 U.S.C. 154(b) by 391 days.

(21) Appl. No.: 13/369,960

(22) Filed: Feb. 9, 2012

(65) Prior Publication Data
US 2012/0206363 A1    Aug. 16, 2012

Related U.S. Application Data

(63) Continuation-in-part of application No. 13/024,435, filed on Feb. 10, 2011.

(30) Foreign Application Priority Data

Dec. 16, 2011 (CA) .................................. 2762408
Feb. 9, 2012 (WO) ................ PCT/US2012/024495

(51) Int. Cl.
*G06F 3/041* (2006.01)
*G06F 3/0488* (2013.01)

(52) U.S. Cl.
CPC ........ *G06F 3/04886* (2013.01); *G06F 3/04883* (2013.01); *G06F 2203/04808* (2013.01)

(58) Field of Classification Search
CPC .......................... G06F 3/04886; G06F 3/04883
USPC .......................................... 345/173; 715/773
See application file for complete search history.

(56) References Cited

U.S. PATENT DOCUMENTS

| 7,098,896 | B2 | 8/2006 | Kushler et al. |
| 2004/0140956 | A1 | 7/2004 | Kushler et al. |
| 2007/0101292 | A1* | 5/2007 | Kupka ........................ 715/810 |

(Continued)

FOREIGN PATENT DOCUMENTS

| EP | 2079010 A2 | 7/2009 |
| JP | 2004-355606 A | 12/2004 |

(Continued)

OTHER PUBLICATIONS

Nickinson, "A.I.type needs testers for its Floating Split Keyboard for tables", Jan. 3, 2012, online: AndroidCentral <http://www.androidcentral.com/aitype-needs-testers-its-floating-split-keyboard-tablets>, 4 pages.

(Continued)

*Primary Examiner* — Amare Mengistu
*Assistant Examiner* — Sarvesh J Nadkarni
(74) *Attorney, Agent, or Firm* — Geoffrey deKleine; Borden Ladner Gervais LLP

(57) ABSTRACT

A method includes detecting a first touch at a first location, and a second touch at a second location, on a touch-sensitive display of an electronic device. In response to detecting the first and second touches, a first section of a virtual keyboard having a first boundary associated with the first location and a second section of the virtual keyboard having a second boundary associated with the second location are displayed on the touch-sensitive display.

19 Claims, 7 Drawing Sheets

(56) References Cited

U.S. PATENT DOCUMENTS

| | | | |
|---|---|---|---|
| 2008/0259039 A1 | 10/2008 | Kocienda et al. | |
| 2009/0167716 A1 | 7/2009 | Wang et al. | |
| 2009/0237359 A1* | 9/2009 | Kim et al. | 345/168 |
| 2009/0273565 A1* | 11/2009 | Garside et al. | 345/168 |
| 2010/0241985 A1 | 9/2010 | Kim et al. | |
| 2011/0047459 A1 | 2/2011 | Van Der Westhuizen | |
| 2011/0074692 A1 | 3/2011 | Causey et al. | |
| 2011/0242138 A1* | 10/2011 | Tribble | 345/663 |

FOREIGN PATENT DOCUMENTS

| | | |
|---|---|---|
| KR | 10-2008-0105183 A | 12/2008 |
| WO | 2009049331 A2 | 4/2009 |

OTHER PUBLICATIONS

Sorrel, "Resize, Split and Rotate iPad Keyboard? There's an App for That", May 19, 2010), online: Wired <http://www.wired.com/gadgetlab/2010/05/resize-split-and-rotate-ipad-keyboard-theres-an-app-for-that/>, 2 pages.

International Patent Application No. PCT/US2012/024495, International Search Report and Written Opinion dated Aug. 22, 2012, 10 pages.

http://blogs.law.harvard.edu/anderkoo/files/2007/05/IMG_0989.JPG.

http://www.x50v.it/content/view/2369/108/ and English Translation.

http://www.assistiveware.com/touchstrokes.php.

http://www.thickbuttons.com.

* cited by examiner ively coupled to the processor 102. However, these subsections may be separated by any suitable distance.

PORTABLE ELECTRONIC DEVICE AND METHOD OF CONTROLLING SAME

CROSS REFERENCE TO RELATED APPLICATION

This patent application is continuation-in-part of and claims priority to U.S. patent application Ser. No. 13/024,435, filed on Feb. 10, 2011, titled "METHOD AND APPARATUS FOR DISPLAYING KEYS OF A VIRTUAL KEYBOARD," the contents of which are incorporated herein by reference in their entirety.

FIELD OF TECHNOLOGY

The present disclosure relates to electronic devices, including but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified based on the functions and operations being performed. With continued demand for decreased size of portable electronic devices, touch-sensitive displays continue to decrease in size.

Improvements in devices with touch-sensitive displays are desirable.

DETAILED DESCRIPTION

Figure 1:
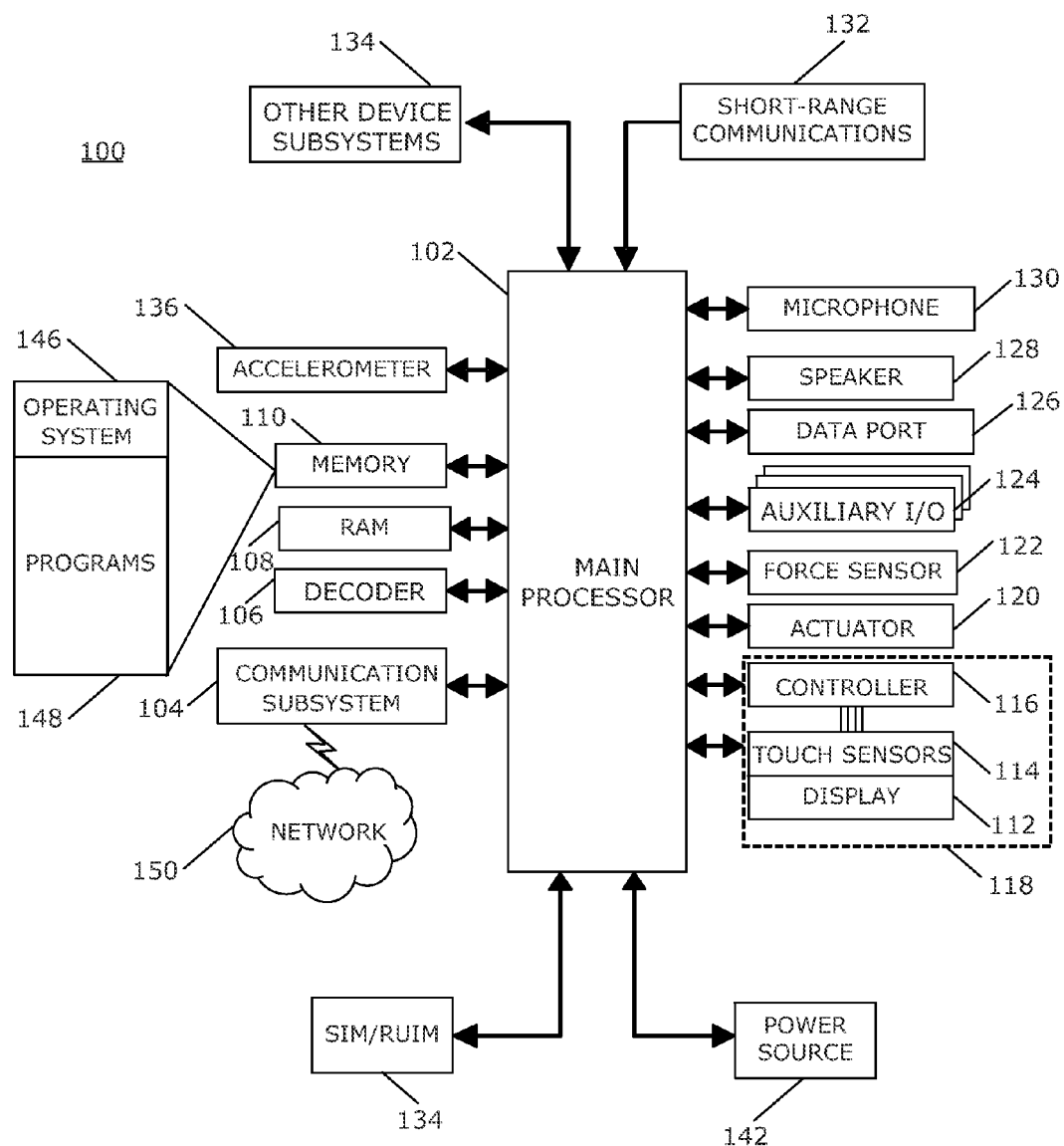
FIG. 1 is a block diagram of a portable electronic device in accordance with the disclosure.

The following describes an apparatus and method of displaying at least two sections of a virtual keyboard in response to detecting at least one touch at one or more locations on a touch-sensitive display of an electronic device. One section of a virtual keyboard that has a boundary associated with one touch location and another section of the virtual keyboard that has a boundary associated with the another touch location are displayed on the touch-sensitive display.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The electronic device may be a portable electronic device without wireless communication capabilities, such as a handheld electronic game, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus, pen, or other pointer, based on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The optional actuator(s) 120 may be depressed or activated by applying sufficient force to the touch-sensitive display 118 to overcome the actuation force of the actuator 120. The actuator(s) 120 may be actuated by pressing anywhere on the touch-sensitive display 118. The actuator(s) 120 may provide input to the processor 102 when actuated. Actuation of the actuator(s) 120 may result in provision of tactile feedback. When force is applied, the touch-sensitive display 118 is depressible, pivotable, and/or movable. Such a force may actuate the actuator(s) 120. The touch-sensitive display 118 may, for example, float with respect to the housing of the portable electronic device, i.e., the touch-sensitive display 118 may not be fastened to the housing. A mechanical dome switch actuator may be utilized. In this example, tactile feedback is provided when the dome collapses due to imparted force and when the dome returns to the rest position after release of the switch. Alternatively, the actuator 120 may comprise one or more piezoelectric (piezo) devices that provide tactile feedback for the touch-sensitive display 118.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
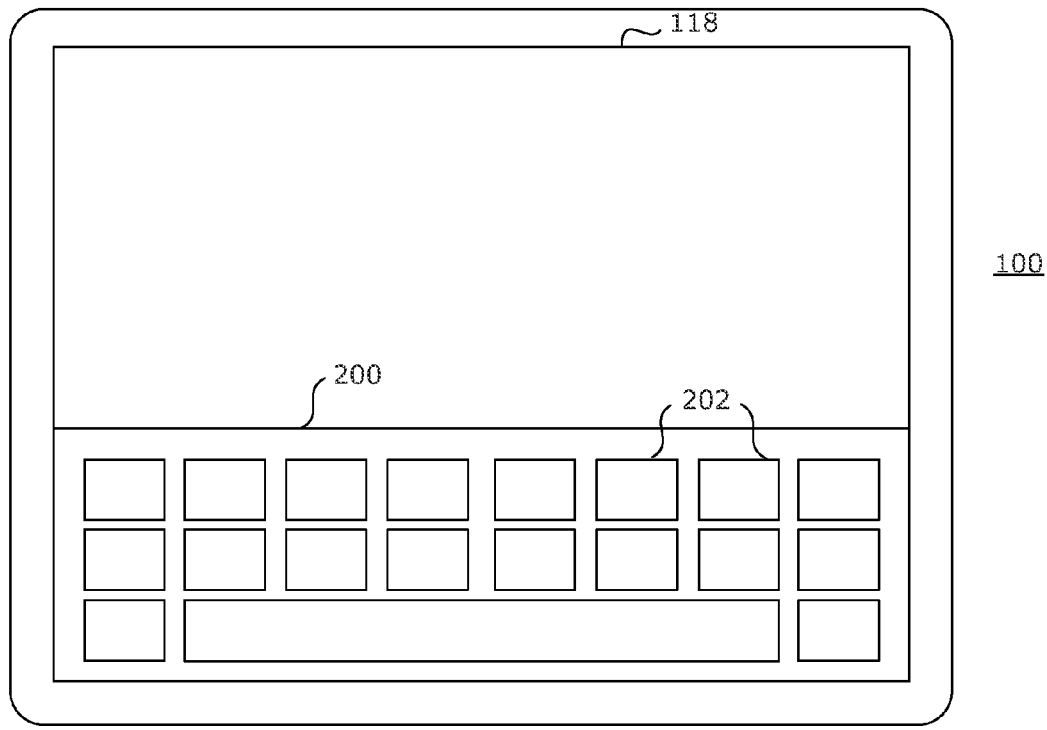
FIG. 2 shows a portable electronic device displaying a virtual keyboard in accordance with the disclosure.

FIG. 2 shows a virtual keyboard 200 displayed on a portable electronic device 100. The virtual keyboard 200 is displayed within the display area of the touch-sensitive display 118. The virtual keyboard 200 is, for example, a visual and functional arrangement of virtual keys 202 arranged in a layout, such as a QWERTY keyboard layout, DVORAK keyboard layout, QWERTZ keyboard layout, AZERTY keyboard layout, numerical keypad layout, or other keyboard layout. One or more characters or functions may be associated with each virtual key 202, which character or function is typically displayed in the area associated with the key. Characters include letters, numbers, symbols, punctuation marks, spaces, and so forth from any language. Functions, including commands, include SHIFT, ALT, CONTROL, ENTER, DELETE, and so forth. For example, an ENTER key may indicate the end of a input string, a function key may switch between keyboard layouts, such as switching between a QWERTY layout and a numerical layout, a function key may hide the virtual keyboard 200, and a function key may open an application, such as a browser application. The function keys may include a key that changes between display of a full virtual keyboard and display of a split keyboard. Touches detected at the locations associated with the virtual keys 202 provide input, such as characters or functions, to an application running on the electronic device 100. Input via the virtual keyboard 200 may be displayed anywhere in the display area of the touch-sensitive display 118, such as the area above the virtual keyboard 200.

The virtual keyboard 200 may be displayed as a full keyboard arrayed along any edge of the display area of the touch-sensitive display 118 or may be displayed elsewhere on the display. The position and size of the virtual keyboard 200 may be based on on the form factor of the device 100, the application(s) executing on the device 100, user preferences, and other factors. For example, the virtual keyboard 200 may be displayed nearer to one edge of the display area of the touch-sensitive display 118, such as the lower or upper edge of the display. In the example show in FIG. 2, the virtual keyboard 200 is displayed at the lower or bottom edge of the display area of the touch-sensitive display 118. The virtual keyboard 200 may optionally be anchored or fixed to one or more edges of the display area, although the virtual keyboard does not need to be anchored.

Figure 3:
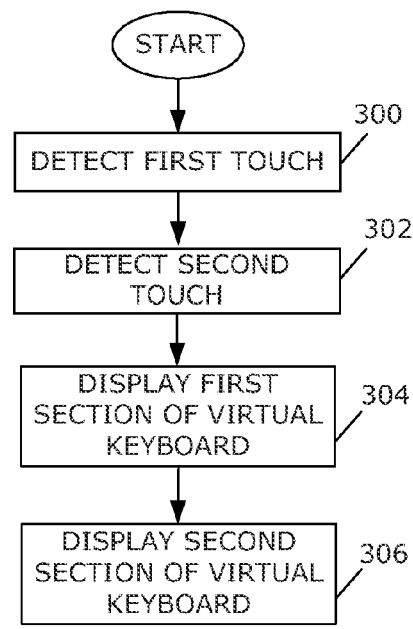
FIG. 3 is a flowchart illustrating a method of displaying sections of a virtual keyboard in accordance with the disclosure.

A flowchart illustrating a method of displaying multiple sections of a virtual keyboard, e.g., a split keyboard, in response to detecting respective touches is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

A first touch is detected 300 at a one location, and a second touch is detected 302 at another location. For example, the first and second touches may overlap at least partially in time. One section of the virtual keyboard is displayed 304 with a boundary associated with one touch location, and another section of the virtual keyboard is displayed 306 with a boundary associated with the other touch location. In the examples described below, the touches are detected in an area the touch-sensitive display 118 associated with the virtual keyboard 200, such as within the area between the outer boundaries of the virtual keyboard 200, or in another area of the touch-sensitive display 118, such as the non-display area.

Figure 4:
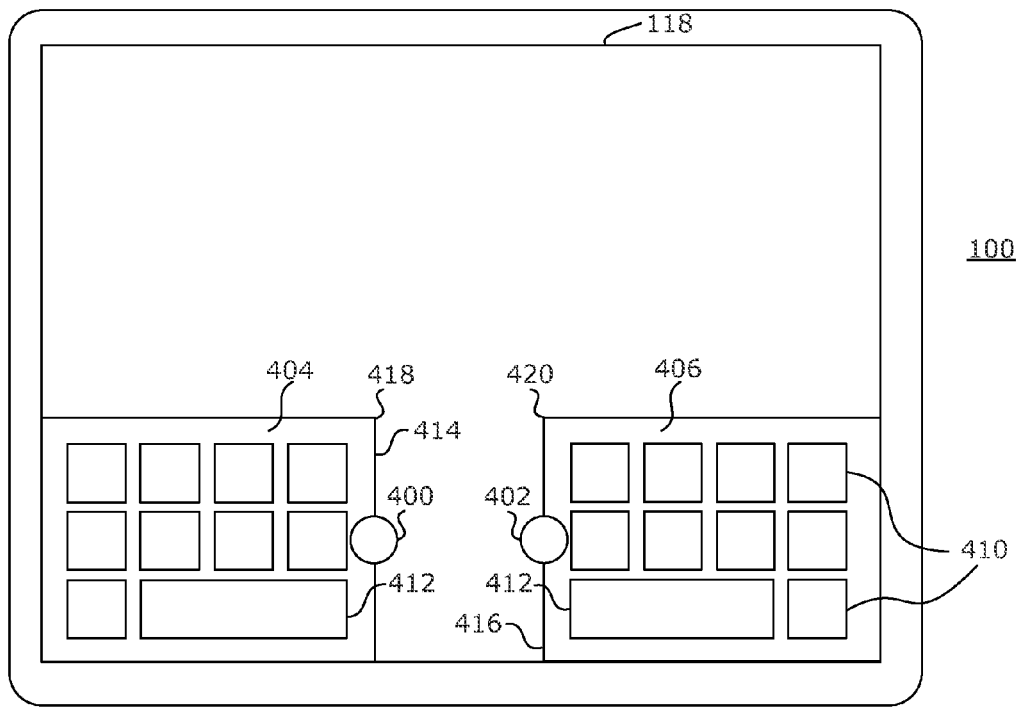
FIG. 4 illustrates a portable electronic device displaying sections of a virtual keyboard in accordance with the disclosure.

An example of a portable electronic device 100 displaying first and second sections of a virtual keyboard is illustrated in FIG. 4. A first touch at a first location 400 and a second touch at a second location 402 are detected. For example, a user may extend a finger or thumb of each hand inwardly from the outer edge of the device 100. A touch is detected on the touch-sensitive display 118 at the first location 400, and another touch is detected on the touch-sensitive display 118 at the second location 402. For example, each touch may be detected in response to a touch on the touch-sensitive display 118 by a finger or thumb of each hand. The first and second touch may be any touches or combinations of touches, such as single taps, double taps, gestures, or any combination thereof.

In response to detecting the touches at the locations 400, 402, the virtual keyboard is split and displayed in two sections 404, 406. In this example, the first section 404 includes a left half of the keys of the full keyboard layout, and the second section 406 includes a right half of the keys of the full keyboard layout. The keys need not be split evenly between the two sections of the split keyboard. Optionally, the size of the virtual keys 410 and/or the spacing between the keys 410 may be scaled, e.g., reduced in one or more dimensions, such that the keys 410 fit within the area of each section 404, 406. The composition or layout of the keys may also be modified in providing the split into the first and second sections 404, 406. For example, keys, such as a SPACE key or function keys, may be displayed in one or both sections. As shown in the example, the virtual keyboard is split into equal halves, with the left half of the keys of the full keyboard 200 displayed in one section 404, the right half of the keys displayed in the other section 406, and keys that span the two halves, such as the SPACE key 412, are displayed in both sections 404, 406. The two sections 404, 406 may be of any shape, size, configuration, or orientation, and need not have the same or similar shape, size, configuration, quantity of keys, number of rows or columns of keys, orientation, and so forth. For example, the two sections may have straight or curved boundaries, may be rectangular, square, or any other shape, and may be displayed anywhere within the display area, such as along any edge of the display area. For example, each section may be a vertical strip of a single column or row of keys along each side of the device 100.

As shown in the example of FIG. 4, the boundary of one section 404 is determined from one touch location 400, and the boundary of the other section 406 is determined from the other location 402. For example, the first and second locations 400, 402 may determine the horizontal dimensions of the first and second sections 404, 406, respectively. In the example of FIG. 4, the first section 404 extends between the left edge of the display area of the touch-sensitive display 118 and an inner vertical boundary 414 that is a vertical line extending through the first location 400. The second section 406 extends between the right edge of the display area and an inner vertical boundary 416 that is a vertical line extending through the second location 402. Optionally, the boundaries of the first and second sections 404, 406 may be stored as a default or as user preference.

Alternatively, the second boundary may be determined without detecting a second touch. For example, in response to detecting a touch, such as a double tap at one location 400 or 402, a second location may be calculated in relation to the first location. The second location may, for example, mirror the first location, such that the second location is the same distance from one side of the touch-sensitive display 118 as the first location is from the opposite side of the touch-sensitive display 118. For example, when the first location 400 is the location of the touch, the second location may be identified as the mirror location 402, which is at the same position, relative to the right side of the display area, as the first location 400 is relative to the hand side.

Alternatively, the first touch location and the second touch location may determine the position of a vertex or corner of each section. For example, the first and second touches may determine locations of corners of the sections 418, 420. As shown in the example of FIG. 4, the first section 400 is bounded by an upper boundary that extends horizontally from the left edge of the display area to one corner 418, and a right boundary that extends vertically from the lower edge of the display area to the same corner 418. Boundaries of second section 402 may be determined similarly in relation to another corner 420.

Optionally, the sections of a split keyboard may differ in size, based on the locations of the touches. The keys in each section may optionally be scaled proportionately to the boundaries associated with the relevant touch location. For example, the locations of the touches may not be equidistant from each side of the display area, resulting in one section being smaller than the other.

Figure 5:
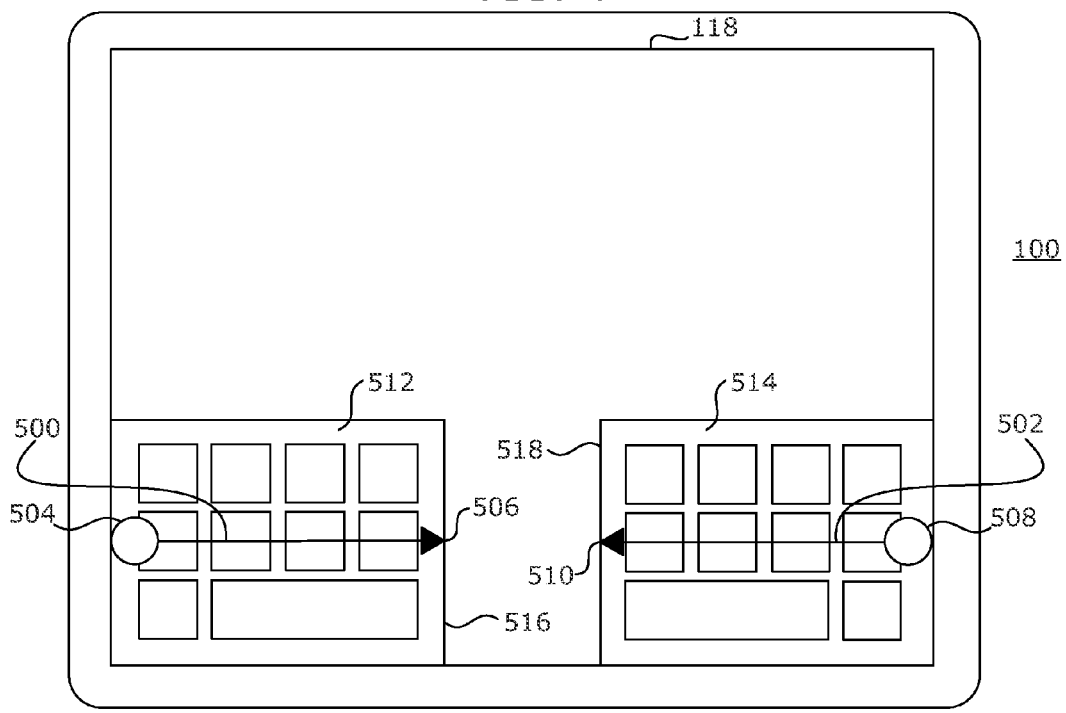
FIG. 5 illustrates a portable electronic device displaying sections of a virtual keyboard in accordance with the disclosure.
Figure 6:
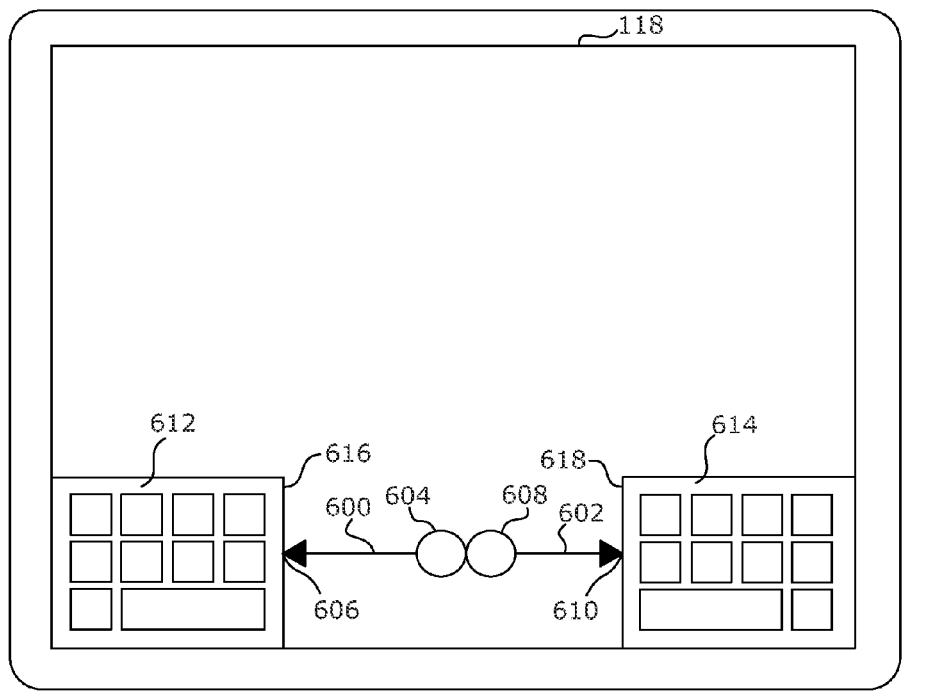
FIG. 6 illustrates a portable electronic device displaying sections of a virtual keyboard in accordance with the disclosure.

Examples of a portable electronic device displaying first and second sections of a virtual keyboard in response to detecting a gesture are shown in FIG. 5 and FIG. 6. In FIG. 5, a gesture along a first path 500 and a gesture along a second path 502 are detected. The first and second gestures are detected in an area associated with the virtual keyboard 200. For example, the paths 500, 502 of the gestures may be completely within the boundary of the virtual keyboard 200 shown in FIG. 2 or may partially associated with the non-display area.

In the example of FIG. 5, the first gesture originates at an origin point 504 at or near a left edge of the display area of the touch-sensitive display 118 and continues along a path 500 that concludes at an end point 506 distant from the left edge. The second gesture originates at an origin point 508 at or near the right or opposing edge of the display area and continues along a path 502 that concludes at an end point 510 distant from the right edge. The origin points 504, 508 may be located in the display area or the non-display area of the touch-sensitive display 118.

In response to detecting the gestures, the virtual keyboard is split into a first section 512 and a second section 514 in this example. The first section 512 includes a left half of the keys of the full keyboard layout, and the second section 514 includes a right half of the keys of the full keyboard layout. Composition, layout, and scaling of the sections 512, 514 may be provided as described above.

The boundary of the first section 512 is determined from one end point 506, and the boundary of the second section 514 is determined from the other end point 510. For example, the right boundary of the first section 512 extends through one end point 506, and the left boundary of the second section 514 extends through the other end point 510. In the example of FIG. 5, the first section 512 extends between the left edge of the display area of the touch-sensitive display 118 to and an inner vertical boundary 516 extending through the end point 506. The second section 514 extends between the right edge of the display area to an inner vertical boundary 518 extending through the end point 510. Optionally, the first section 512 and the second section 514 may differ in size, based on the locations of the end points 506, 510, and the keys in each section may be scaled proportionately. The locations of the end points may determine the position of a vertex or corner of each section, such as described above.

In the example of FIG. 6, a first gesture along a first path 600 and a second gesture along a second path 602 are detected in an area associated with the virtual keyboard 200. In this example, the paths 600, 602 are detected in a direction opposite to the paths 500, 502 of FIG. 5, although the resulting sections are the same in the examples.

In this example, the first gesture originates at an origin point 604 and continues along the path 600 that concludes at an end point 606 to the left of the origin point 604. The second gesture originates at an origin point 608 and continues along the path 602 that concludes at an end point 610 to the right of the origin point 608.

In response to detecting these gestures, the virtual keyboard is split into a first section 612 and a second section 614 in this example. The first section 612 includes a left half of the keys of the full keyboard layout, and the second section 614 includes a right half of the keys of the full keyboard layout. Composition, layout, and scaling of the sections 612, 614 may be provided as described above.

The boundary of the first section 612 is determined from the end point 606, and the boundary of the second section 614 is determined from the end point 610 in the example of FIG. 6. For example, the horizontal dimension of the first section 612 is determined from one end point 606, and the horizontal dimension of the second section 614 is determined from the other end point 610. In the example of FIG. 6, the first section 612 extends between the left edge of the display area of the touch-sensitive display 118 and an inner vertical boundary 616 extending from the lower edge through the end point 606. The second section 614 extends between the right edge of the display area and an inner vertical boundary 618 extending from the lower edge through the other end point 610. Optionally, the first section 612 and the second section 614 may differ in size, based on the locations of the end points 606, 610, and the keys in each section may be scaled proportionately. The locations of the end points may determine the position of a vertex or corner of each section, such as described above.

In one alternative example, gestures similar to those shown in FIG. 6 are detected, in response to which gestures the boundaries 616, 618 are determined from the origin points of the gestures, and the end points of the gestures do not affect the dimensions of the keyboard sections 612, 614. In another alternative example, gestures similar to those shown in FIG. 6 may be detected, in response to which gestures the boundaries 616, 618 are determined when the gestures end, but not by the physical locations of the end points of the gestures. In this alternative example, when the gestures are detected extending toward the sides, the keyboard is dynamically split, and as long as one or more of the gestures continues to move and be detected, the sections 612, 614 continue to get smaller until the gestures end. A visual display of the keys as they are continually resized provides guidance to the section size until the gestures are no longer detected. Each section may be sized differently based on the gesture closest to that section. Thus, the end points are not at the boundaries, although the boundaries are determined from the end points. The end points of these gestures may be located in the display area or the non-display area of the touch-sensitive display 118.

Figure 7:
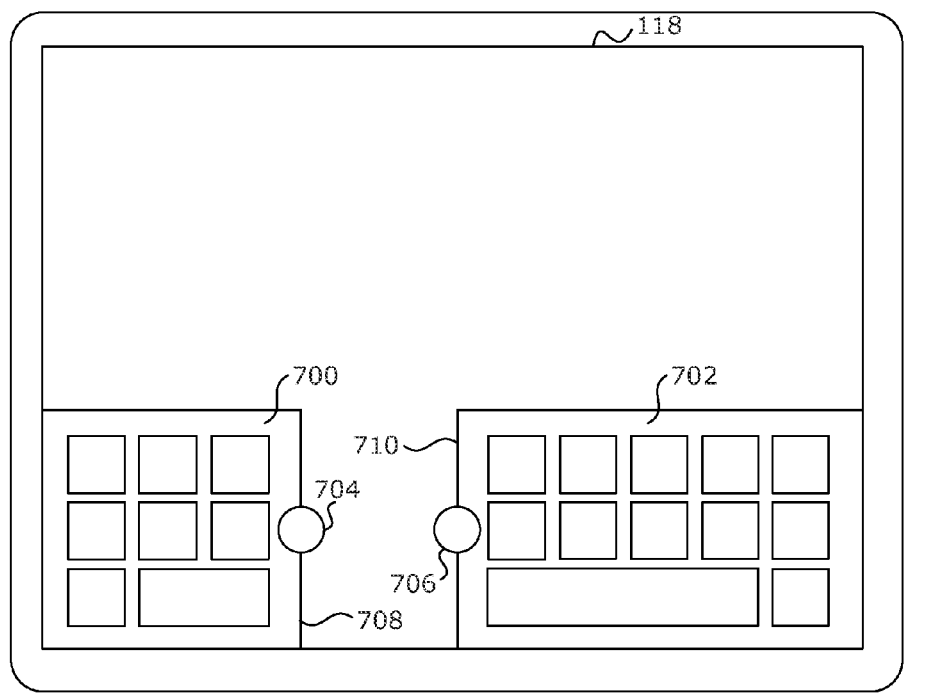
FIG. 7 illustrates a portable electronic device displaying sections of a virtual keyboard in accordance with the disclosure.

As shown in the example of FIG. 7, the composition of a first virtual keyboard section 700 and a second virtual keyboard section 702 may be established by dividing the virtual keyboard 200 into two sections of different sizes having a different quantity of keys in section 700, 702. For example, a user may hold the device 100 on each side and extend each thumb inwardly from an edge of the device 100, and touch the touch-sensitive display at two locations 704, 706. The touches at the locations 704, 706 may overlap at least partially in time. The touches are detected in an area associated with the virtual keyboard 200. The boundary of the first section 700 is determined from the first location 704, and the boundary of the second section 702 is determined from the second location 606. For example, the locations 704, 706 may determine the horizontal dimensions of the first and second sections 700, 702, respectively. In the example of FIG. 7, the first section 700 extends between the left edge of the display area of the touch-sensitive display 118 and an inner vertical boundary 710 extending from the lower edge through the first location 704. The second section 702 extends between the right edge of the display area and an inner vertical boundary 710 extending from the lower edge through the second location 706. Other touches, such the gestures shown in FIG. 5 and FIG. 6, may be utilized to establish the boundaries of the first and second sections 700, 702. Alternatively, the touch locations may identify corners of the sections 700, 702 as described above.

As shown in the example of FIG. 7, the first section 700 and the second section 702 differ in size, and the distribution and layout of the keys 712 in each section are determined proportionately. For example, fewer keys 712 are displayed in the first section 700 than are displayed in the larger second section 702. Optionally, the size of the keys 712 and/or the spacing between the keys 712 may be scaled, e.g., reduced in one or more dimensions, to fit within the first and second sections 700, 702. The composition or layout of the keys may also be modified in providing the split into the first and second sections 700, 702. For example, keys, such as a SPACE key or function keys, may be displayed in one or both sections, based on the space available in each section.

The virtual keyboard 200 may be positioned, repositioned, or moved, within the display area, such as in response to detecting a touch such as a gesture that moves the virtual keyboard 200 to a new position or by another input that initiates repositioning. For example, the virtual keyboard 200 or each section may be repositioned in response to a menu selection, a touch associated with a displayed selection option, and so forth. A subsequent touch, including a gesture, repositions the keyboard or keyboard section a position associated with the subsequent such, e.g., at the upper edge of the display area or any new position within the display area. Each section of a split keyboard may be positioned, repositioned, or moved individually, or a mirrored display may result.

The virtual keyboard or its split sections may be resized by input associated with a boundary, such as detection of a hold and drag gesture associate with a boundary of the virtual keyboard or any section of the virtual keyboard to reduce or expand the size of the keyboard within the display area. For example, an upper boundary of the virtual keyboard/section may be moved upwards to increase the size of the keyboard/section or downward to reduce the size of the keyboard/section, a vertical boundary may be moved to the left or right to increase or decrease the width of a keyboard section, and so forth. Resizing the virtual keyboard or one of its sections may include resizing or scaling of the virtual keys 202. Each section of the keyboard may be separately and individually resized. Optionally, the resizing may be symmetrically performed, such that each section of the virtual keyboard is similarly resized. Other options include changing the number of rows or columns of the keyboard or keyboard section, changing which keys are associated with each section by quantity, and so forth. For example, a row or column of keys may be dragged from one key section to another key section.

Figure 8:
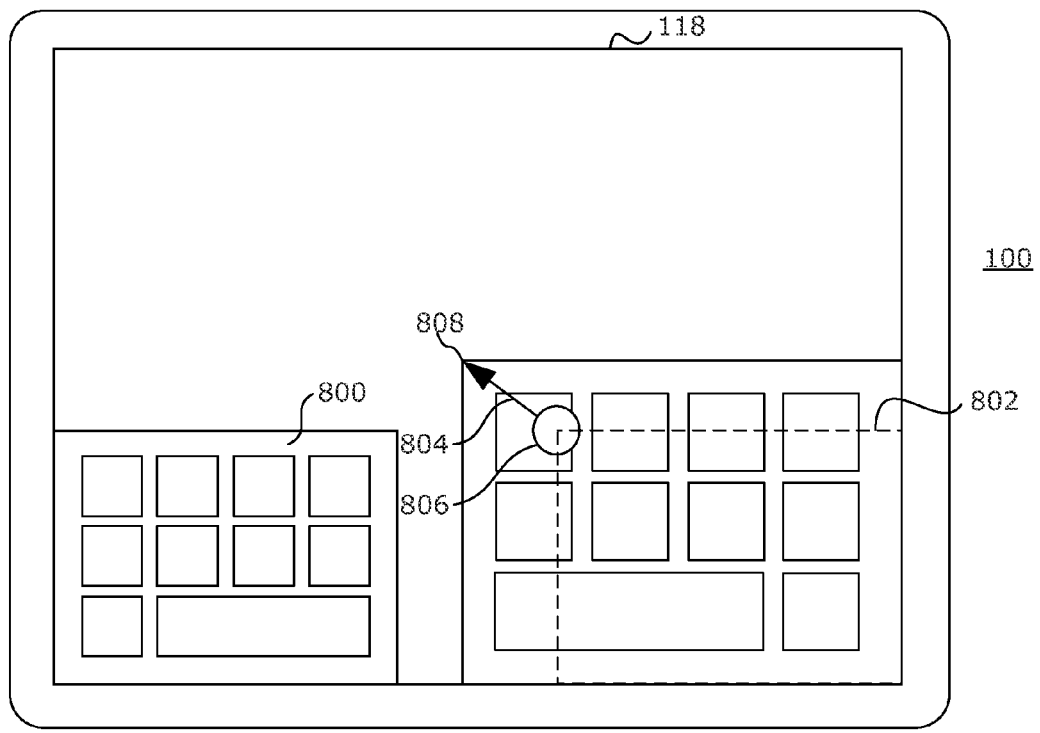
FIG. 8 illustrates a portable electronic device displaying sections of a virtual keyboard in accordance with the disclosure.

An example of a portable electronic device displaying a split virtual keyboard is shown in FIG. 8. The keyboard may be split into two sections as described above, or by any other process, such as input through a menu, selection of a virtual key displayed on the touch-sensitive display 118, actuation of a key, button, or other input device of the electronic device 100, and so forth. Two sections 800, 802 are initially displayed in response to detecting an input, such as one or more touches including gestures that split a virtual keyboard. A section may be resized in response to input associated with a border or boundary of a section. For example, one or more boundaries of a section are identified, e.g., by detecting a hovering or sustained touch at a location associated with a horizontal boundary, vertical boundary, or corner of a section. Subsequent movement of the touch or a separate touch results in determination of the new horizontal boundary, vertical boundary, or corner of the section.

For example, the size or dimensions of a section 802 may be modified in response to detection of a touch originating at the corner 806 of the section 802 and continuing along a path 804 that concludes at the end point 808. In this example, the modified or resized boundary for the section 806 includes an upper boundary that extends horizontally from the right edge of the display area to the end point 808, and a vertical boundary that extends from the lower edge of the display area to end point 808. One or more boundaries of the other section 800 may be modified similarly. Alternatively, one boundary may be moved at a time when a touch is detected that is associated with a single boundary instead of a corner.

Optionally, the size and/or orientation of each virtual keyboard section may be determined by detecting a user's grip on the device 100. For example, sensors may be disposed on the sides or rear of the device 100, which sensors sense the positions, for example, of a user's fingers holding the device. The sensed positions may be processed and matched to profiles indicating an expected size and/or position of the user's hands. The calculated size and/or position of each hand, for example based on human metrics averages to determine thumb length, or reach, in accordance with hand size and grip position, may be utilized to determine an optimum size and/or position for each section of the split keyboard. As an example, an uneven grip on the device 100 may result in the two sections of the split virtual keyboard being of different sizes, and one section may be tilted or angled in relation to the other.

In any of the examples described, when a gesture or moving touch establishes a boundary, the sections of the keyboard may optionally dynamically move along with the location of the touch, thus providing a continual visual indication of the size and layout of the keys. For example, the sizes and locations of the keys may change as the touches establishing the boundaries, borders, or dimensions move.

A method and apparatus includes displaying one or more keys of a virtual keyboard in one or more windows of a graphical user interface of the touch sensitive device. The method comprises displaying a first set of the one or more keys on a first window of the one or more windows; detecting a touch, such as by receiving a first touch event comprising a plurality of first touch values and receiving a second touch event comprising a plurality of second touch values associated with the touch detected by the touch sensitive device; and displaying a second set of the one or more keys in a second window of the one or more windows based at least in part on the second touch event.

The size of the second window may be associated with the size of the first window. The displaying a second set of the one or more keys on a second window occurs when at least one threshold may be met by at least one difference between the first touch values and the second touch values. The at least one threshold may include one of a time threshold and a diagonal threshold, the time threshold may be met by a time difference between the first touch values and second touch values, and the diagonal threshold may be met by at least one location difference between the first touch values and the second touch values. The time difference may be a difference between a first time value of the first touch values and a second time value of the second touch values and the at least one location difference is a difference between at least one first location value of the first touch values and at least one second location value of the second touch values. The second touch value may include a type, and the type may be that of one of a move event and a touch up event. The one or more keys comprised by the second set may be based at least in part on one of the one or more keys associated with the first touch event.

The method may further comprise deactivating the first window when the second window is displayed, wherein the deactivating comprises changing a color of the first set of the one or more keys.

The method may further comprise receiving a third touch event comprising a plurality of third touch values; displaying a third set of the one or more keys on a third window of the one or more windows based at least in part on the third touch event; and deactivating the first window and the second window when the third window is displayed. Such deactivation may be, indicated by changing a color of the first set and the second set of the one or more keys. The one or more keys comprised by the third set is based at least in part on one of the one or more keys comprised by the second set that is associated with the second touch event. The third window may be displayed on top of one of the first window and the second window.

A method for displaying one or more keys of a virtual keyboard on one or more windows of a graphical user interface of a touch sensitive device is provided. The method comprises displaying a first set of the one or more keys on a first window of the one or more windows; receiving a first touch event comprising a plurality of first touch values; receiving a second touch event comprising a plurality of second touch values associated with a touch detected by the touch sensitive device; and displaying a second set of the one or more keys on a second window of the one or more windows based at least in part on the second touch event.

Optionally, the size of the second window may be associated with the size of the first window. The displaying a second set of the one or more keys on a second window may occur when at least one threshold is met by at least one difference between the first touch values and the second touch values. The at least one threshold may include one of a time threshold and a diagonal threshold, the time threshold may be met by a time difference between the first touch values and second touch values, and the diagonal threshold may be met by at least one location difference between the first touch values and the second touch values. The time difference may be a difference between a first time value of the first touch values and a second time value of the second touch values and the at least one location difference may be a difference between at least one first location value of the first touch values and at least one second location value of the second touch values. The second touch value may include a type, and the type may be that of one of a move event and a touch up event. The one or more keys comprised by the second set may be based at least in part on one of the one or more keys that is associated with the first touch event.

The method may further comprise deactivating the first window when the second window is displayed. Such deactivation may comprise changing a color of the first set of the one or more keys.

The method may further comprise receiving a third touch event comprising a plurality of third touch values; and displaying a third set of the one or more keys on a third window of the one or more windows based at least in part on the third touch event. The third window may be displayed on top of one of the first window and the second window. The one or more keys comprised by the third set may be based at least in part on one of the one or more keys comprised by the second set that is associated with the second touch event. The method may further comprise deactivating the first window and the second window when the third window is displayed, wherein the deactivating comprises changing a color of the first set and the second set of the one or more keys.

Figure 9:
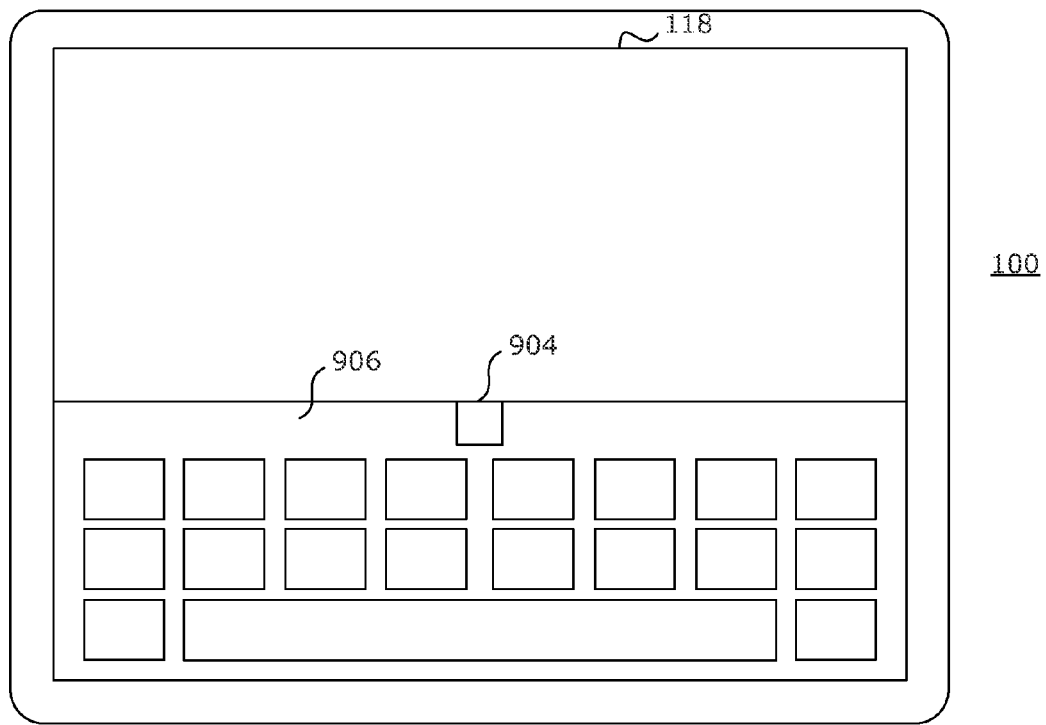
FIG. 9 illustrates a portable electronic device displaying a virtual keyboard in accordance with the disclosure.
Figure 10:
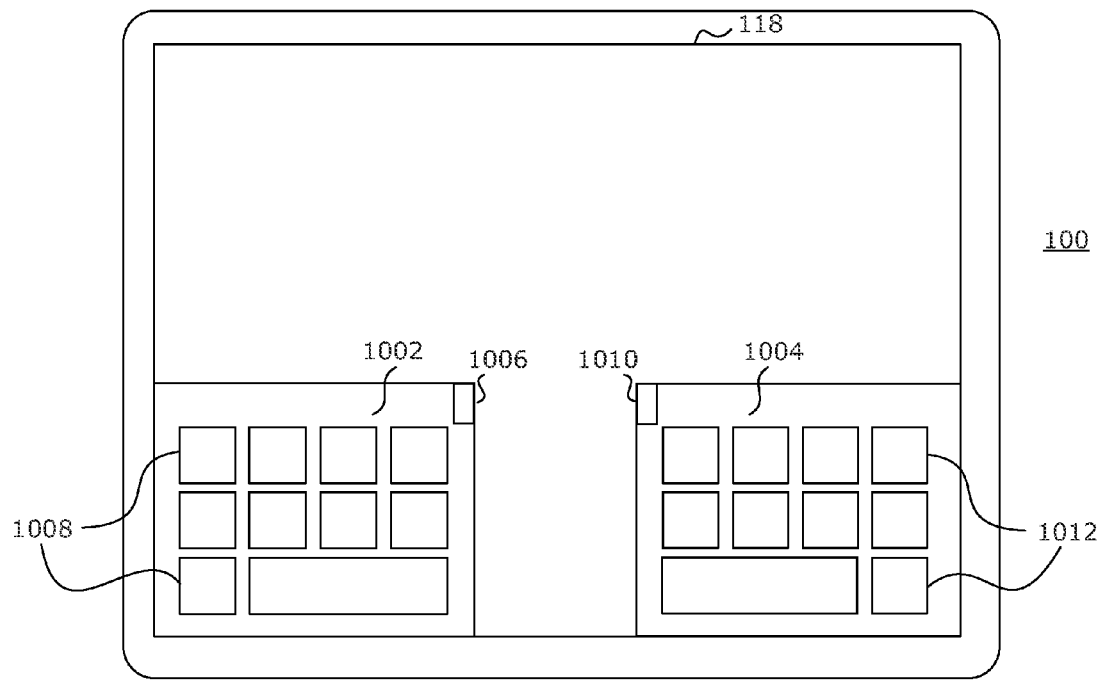
FIG. 10 illustrates a portable electronic device displaying sections of a virtual keyboard in accordance with the disclosure.

A diagram of a touch sensitive device 100 configured to display a virtual keyboard is shown in FIG. 9. The touch sensitive device 100 includes a touch-sensitive display 118 that shows the output of a virtual keyboard application. The output of the virtual keyboard application includes a control 904 and set of keys 906. The control 904 may be used to split and resize the virtual keyboard. FIG. 10 shows the keyboard of FIG. 9 split into a first virtual keyboard section 1002 and a second virtual keyboard section 1004 by actuating control 904.

Figure 11:
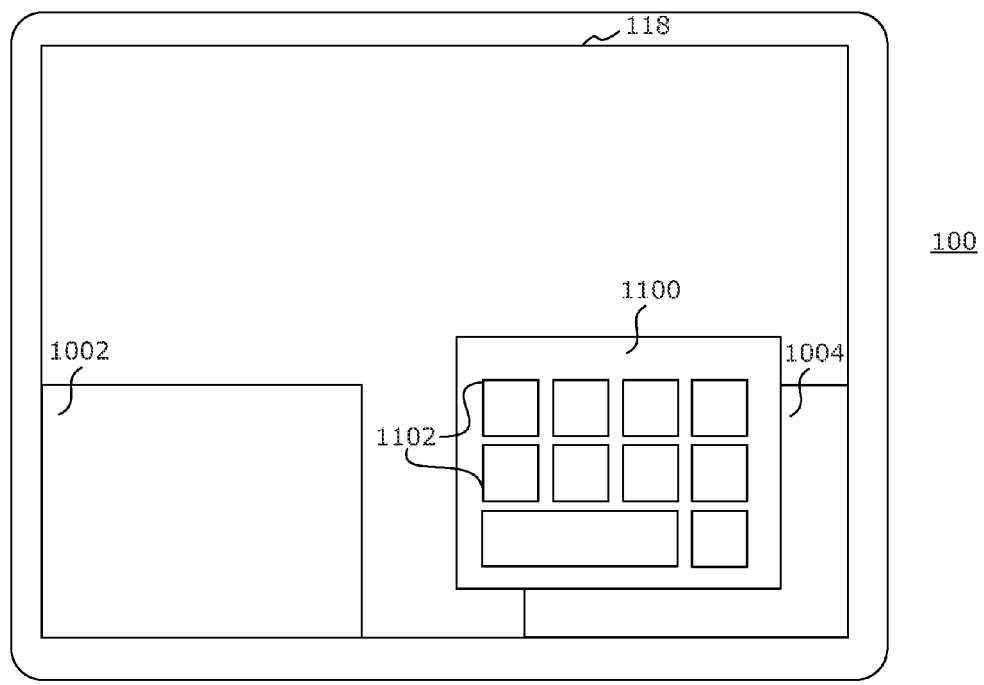
FIG. 11 illustrates a portable electronic device displaying an additional section of a virtual keyboard in accordance with the disclosure.
Figure 12:
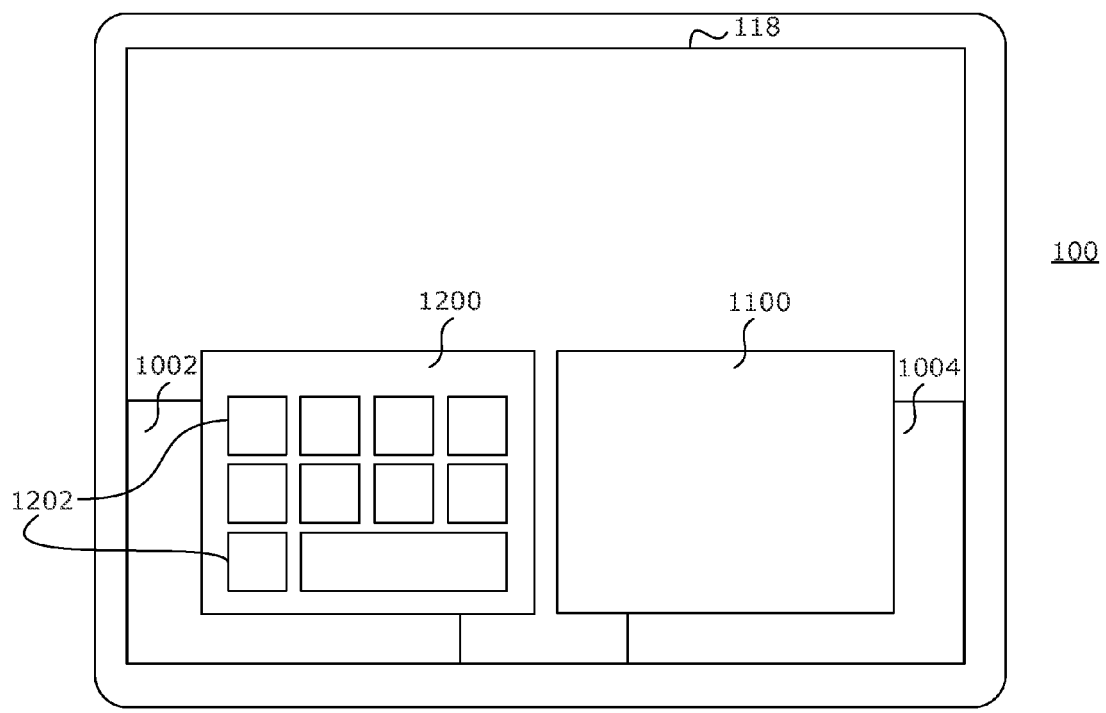
FIG. 12 illustrates a portable electronic device displaying another section of a virtual keyboard in accordance with the disclosure.

With reference to FIG. 10 through FIG. 12, a portable electronic device sets of keys displayed in response to previous key inputs to the split virtual keyboard of FIG. 10 is described. Section 1002 includes control 1006 and set of keys 1008. Section 1004 includes control 1010 and set of keys 1012. As compared to the output of the virtual keyboard application in FIG. 9, the split virtual keyboard in FIG. 10 has been split and resized. This may be performed by a user touching the display of the touch sensitive device where control 904 is located and moving the touch over to where control 1010 is located. In this case, the differences between a touch down event corresponding to where control 904 is located and a touch up event corresponding to where control 1010 is located to provide the basis for resizing the output of the virtual keyboard. Further manipulations of controls 1006 and 1010 may continue to change the size of section 1002 and also change the size of section 1004.

In the example of FIG. 11, keys are displayed within a popup window 1100. The keys within sections 1002 and 1004 are deactivated while popup window 1100 is displayed. The set of keys 1102 displayed in window 1100 are based at least in part on the previously selected key in one of sections 1002 and 1004. For example, when a key selected from section 1002 corresponds to the letter 'A', the set of keys 1102 may include the letters that are most commonly selected after the letter 'A' has been selected, including the letter 'T'.

FIG. 12 shows further keys displayed within a popup window 1200. Virtual keyboard sections 1002, 1004, and popup window 1100 are inactive or deactivated. Popup window 1200, displayed over section 1012, includes a set of keys 1202. The set of keys 1202 are based at least in part on the previously selected key from popup window 1100. For example, when a key selected from popup window 1100 corresponds to the letter 'T', the set of keys 1202 may include the letters that are most commonly selected after the letters 'A' and 'T' have been selected, including the letter 'H'. Additional windows may continue to be displayed on top of prior windows until a word has been spelled out. In alternative embodiments, windows 1100 and 1200 may be displayed in substantially the same portion of the display area. For example, when a letter 'A' is selected from a first window (e.g., section 1002), a second (or third) window may be displayed on top of the first window. Similarly, when a letter 'T' is selected from the second window on top of the first window, a third (or fourth) window may be displayed on top of both the first and second windows.

The terms left, right, top, bottom, horizontal, vertical, up, down, side, rear, and so forth are utilized to provide a perspective with respective to viewing the drawings and are not otherwise limiting.

Throughout the examples, the vertical height of the keys may remain the same as the height of the original keyboard, may be reduced from the height of the original keyboard, or may be greater than the height of the original keyboard. As described above, the boundaries may be changed after the original display of the sections of the split keyboard.

The ability to change a full virtual keyboard to a split virtual keyboard is desirable, particularly when the display area of touch-sensitive displays increases in size. Displaying multiple sections of a virtual keyboard permits a virtual keyboard to be quickly split, and optionally resized, in an intuitive and easily learned manner. A user may, for example, change from full-keyboard typing to thumb typing, as desired. The two sections of the split keyboard are customizable to the user's hand size and reach, which may improve a user's experience and interaction with a portable electronic device.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   detecting, on a touch-sensitive display of an electronic device, a first touch at a first location and a second touch at a second location;
   in response to detecting the first touch and the second touch:
      displaying a first section of a virtual keyboard on the touch-sensitive display, from the first location to a first edge of the touch-sensitive display and from the first location to a second edge perpendicular to the first edge, wherein the first section has a first boundary that is generally parallel with the first edge and extends from the first location, and a second boundary that is generally parallel with the second edge and extends from the first location; and
      displaying a second section of the virtual keyboard on the touch-sensitive display, from the second location to a third edge perpendicular to the second edge of the touch-sensitive display and from the second location to the second edge, wherein the second section has a third boundary that is generally parallel with the third edge and extends from the second location, and a fourth boundary that is generally parallel with the second edge and extends from the second location, wherein the second section is different than the first section;
   wherein the first section comprises keys from a right side of an alphabetical keyboard layout and the second section comprises keys from a left side of the alphabetical keyboard layout such that, together, the first section and the second section comprise all keys of a full alphabetical keyboard layout.

2. The method according to claim 1, wherein detecting comprises detecting the first touch and the second touch within an area of the touch-sensitive display associated with the virtual keyboard.

3. The method according to claim 1, wherein the first touch and the second touch overlap at least partially in time.

4. The method according to claim 1, wherein the first location is determined from a concluding end point of the first touch and the second location is determined from a concluding end point of the second touch.

5. The method according to claim 1, wherein the first location is an origin point of the first touch and the second location is an origin point of the second touch.

6. The method according to claim 1, further comprising resizing one of the first section and the second section in response to input associated with one of the first boundary and the second boundary.

7. A non-transitory computer-readable medium having computer-readable code executable by at least one processor of the electronic device to perform the method of claim 1.

8. A method comprising:
   detecting, on a touch-sensitive display of an electronic device, a first touch at a first location and a second touch at a second location;
   in response to detecting the first touch and the second touch:
      displaying a first section of a virtual keyboard on the touch-sensitive display, from the first location to a first edge of the touch-sensitive display and from the first location to a second edge perpendicular to the first edge, wherein the first section has a first boundary that is generally parallel with the first edge and extends from the first location, and a second boundary that is generally parallel with the second edge and extends from the first location; and
      displaying a second section of the virtual keyboard on the touch-sensitive display, from the second location to a third edge perpendicular to the second edge of the touch-sensitive display and from the second location to the second edge, wherein the second section has a third boundary that is generally parallel with the third edge and extends from the second location, and a fourth boundary that is generally parallel with the second edge and extends from the second location, wherein the second section is different than the first section;
   wherein the first section comprises keys from a right side of an alphabetical keyboard layout and the second section comprises keys from a left side of the alphabetical keyboard layout such that, together, the first section and the second section comprise all keys of a full alphabetical keyboard layout;
   detecting a third touch having a third location associated with the first boundary;
   in response to the detecting the third touch, displaying the first section with a modified boundary associated with the third location.

9. The method according to claim 8, wherein the third touch has an origin point and a concluding end point.

10. The method according to claim 9, wherein the modified boundary is associated with the concluding end point.

11. An electronic device comprising:
a touch-sensitive display;
a processor coupled to the touch-sensitive display and configured to:
  detect, on the touch-sensitive display, a first touch at a first location and a second touch at a second location;
  in response to detecting the first touch and the second touch:
    display a first section of a virtual keyboard on the touch-sensitive display, from the first location to a first edge of the touch-sensitive display and from the first location to a second edge perpendicular to the first edge, wherein the first section has a first boundary that is generally parallel with the first edge and extends from the first location, and a second boundary that is generally parallel with the second edge and extends from the first location; and
    display a second section of the virtual keyboard on the touch-sensitive display, from the second location to a third edge perpendicular to the second edge of the touch-sensitive display and from the second location to the second edge, wherein the second section has a third boundary that is generally parallel with the third edge and extends from the second location, and a fourth boundary that is generally parallel with the second edge and extends from the second location, wherein the second section is different than the first section;
  wherein the first section comprises keys from a right side of an alphabetical keyboard layout and the second section comprises keys from a left side of the alphabetical keyboard layout such that, together, the first section and the second section comprise all keys of a full alphabetical keyboard layout.

12. The electronic device according to claim 11, wherein the first touch and the second touch are detected within an area of the touch-sensitive display associated with the virtual keyboard.

13. The electronic device according to claim 11, wherein the first touch and the second touch overlap at least partially in time.

14. The electronic device according to claim 11, wherein the first location is determined from a concluding end point of the first touch and the second location is determined from a concluding end point of the second touch.

15. The electronic device according to claim 11, wherein the first location is determined from an origin point of the first touch and the second location is determined from an origin point of the second touch.

16. The electronic device according to claim 11, wherein the processor is further configured to resize one of the first section and the second section in response to input associated with one of the first boundary and the second boundary.

17. A method comprising:
detecting at least one touch on a touch-sensitive display of an electronic device;
determining a first and a second location in response to the at least one touch;
in response to the determining:
  displaying a first section of a virtual keyboard on the touch-sensitive display, from the first location to a first edge of the touch-sensitive display and from the first location to a second edge perpendicular to the first edge, wherein the first section has a first boundary that is generally parallel with the first edge and extends from the first location, and a second boundary that is generally parallel with the second edge and extends from the first location; and
  displaying a second section of the virtual keyboard on the touch-sensitive display, from the second location to a third edge perpendicular to the second edge of the touch-sensitive display and from the second location to the second edge, wherein the second section has a third boundary that is generally parallel with the third edge and extends from the second location, and a fourth boundary that is generally parallel with the second edge and extends from the second location;
  wherein the first section comprises keys from a right side of an alphabetical keyboard layout and the second section comprises keys from a left side of the alphabetical keyboard layout such that, together, the first section and the second section comprise all keys of a full alphabetical keyboard layout.

18. The method according to claim 17, wherein the first location is a location associated with the at least one touch, and wherein the second location is a mirrored location of the first location.

19. A non-transitory computer-readable medium having computer-readable code executable by at least one processor of the electronic device to perform the method of claim 17.

* * * * *